(12) United States Patent
Bryan

(10) Patent No.: US 7,216,854 B2
(45) Date of Patent: May 15, 2007

(54) MODULAR FENCE

(76) Inventor: Thomas R. Bryan, 601 LaPorte Ave., Wilmette, IL (US) 60091

( * ) Notice: Subject to any disclaimer, the term of this patent is extended or adjusted under 35 U.S.C. 154(b) by 86 days.

(21) Appl. No.: 10/783,872

(22) Filed: Feb. 20, 2004

(65) Prior Publication Data
US 2005/0184281 A1   Aug. 25, 2005

(51) Int. Cl.
*E04H 17/16* (2006.01)
(52) U.S. Cl. .................. 256/25; 256/22; 256/65.01; 256/65.11
(58) Field of Classification Search .................. 256/1, 256/22, 65.01, 67, 65.02, 65.03, 65.15, 25, 256/3, 11, 21, 24, 65.11, 65.12, 65.14, DIG. 2; 119/519, 522, 512, 513; 47/32, 33; 428/137; D25/35, 38, 42
See application file for complete search history.

(56) References Cited

U.S. PATENT DOCUMENTS

| | | | | |
|---|---|---|---|---|
| 610,803 | A * | 9/1898 | Elliott | 47/45 |
| 1,211,059 | A * | 1/1917 | Blank | 256/1 |
| 1,236,185 | A * | 8/1917 | Lachmam | 256/22 |
| 1,476,853 | A * | 12/1923 | Tabor | 256/1 |
| 3,096,079 | A * | 7/1963 | Winn | 256/24 |
| 3,484,081 | A * | 12/1969 | Rowan | 256/22 |
| 3,537,687 | A * | 11/1970 | Adelman | 256/19 |
| 3,701,477 | A * | 10/1972 | Matt et al. | 239/276 |
| 4,174,096 | A * | 11/1979 | Campbell | 256/24 |
| 4,301,996 | A * | 11/1981 | Holyoak | 256/1 |
| 4,930,753 | A * | 6/1990 | Alvyn | 256/26 |
| 5,192,054 | A * | 3/1993 | Sharp | 256/24 |
| 5,415,380 | A * | 5/1995 | Sharp | 256/24 |
| 5,887,856 | A * | 3/1999 | Everly, II | 256/1 |
| 5,964,452 | A * | 10/1999 | Summers | 256/65.08 |
| D422,367 | S * | 4/2000 | Mishina | D25/38 |
| 6,123,321 | A | 9/2000 | Miller | |
| 6,182,948 | B1 * | 2/2001 | Brandeis | 256/65.13 |
| D443,698 | S * | 6/2001 | Kazakidis | D25/38 |
| 6,360,481 | B1 | 3/2002 | Nesic | |
| 6,622,426 | B2 * | 9/2003 | Conde | 47/33 |
| 6,631,887 | B1 | 10/2003 | Walmsley | |
| 2002/0125465 | A1 | 9/2002 | Goodson | |

OTHER PUBLICATIONS

Snapdragon Industries, Inc., "EZ Rabbit Garden Fencing," http://www.ezrabbitfencing.com, Feb. 4, 2004.

* cited by examiner

*Primary Examiner*—Daniel P. Stodola
*Assistant Examiner*—Daniel J. Mills
(74) *Attorney, Agent, or Firm*—Beem Patent Law Firm

(57) ABSTRACT

A novel fence module is provided for use in a burrowing-animal discouraging modular fence, the module comprising a plurality of generally parallel elongate members each having an upper end and a tapered lower end, upper and lower crossbars connecting the plurality of elongate members in a row with a pair of end members and a plurality of intermediate members, wherein the elongate members have a spacing of between about 1 inch and about 2½ inches, a connector extending outwardly beyond at least one of the pair of end members for closely connecting the module to another module, wherein the tapered lower ends of the elongate members extend at least about 3 inches below the lower crossbar for insertion into ground, and wherein the elongate members extend at least about 16 inches above the lower crossbar.

2 Claims, 4 Drawing Sheets

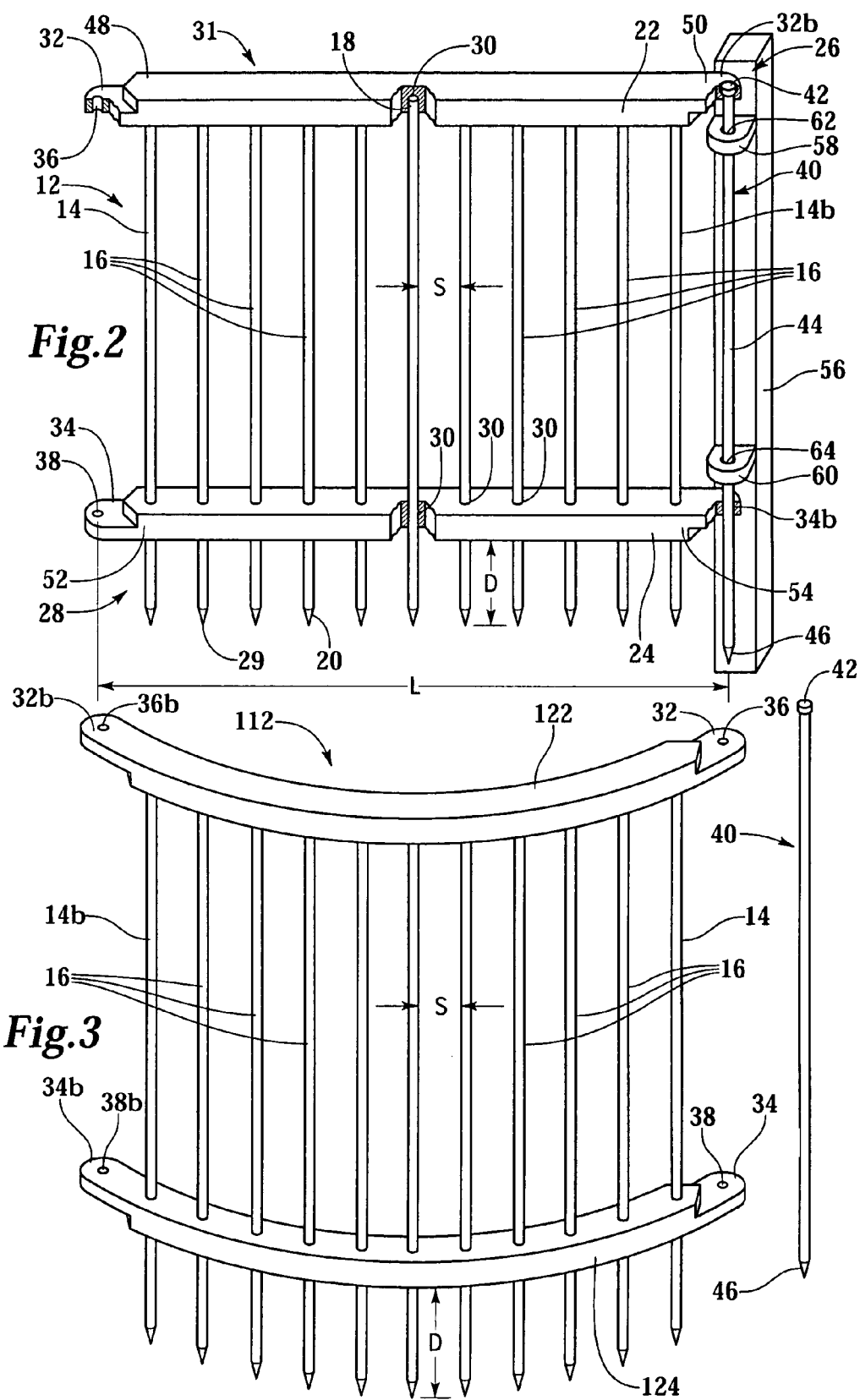

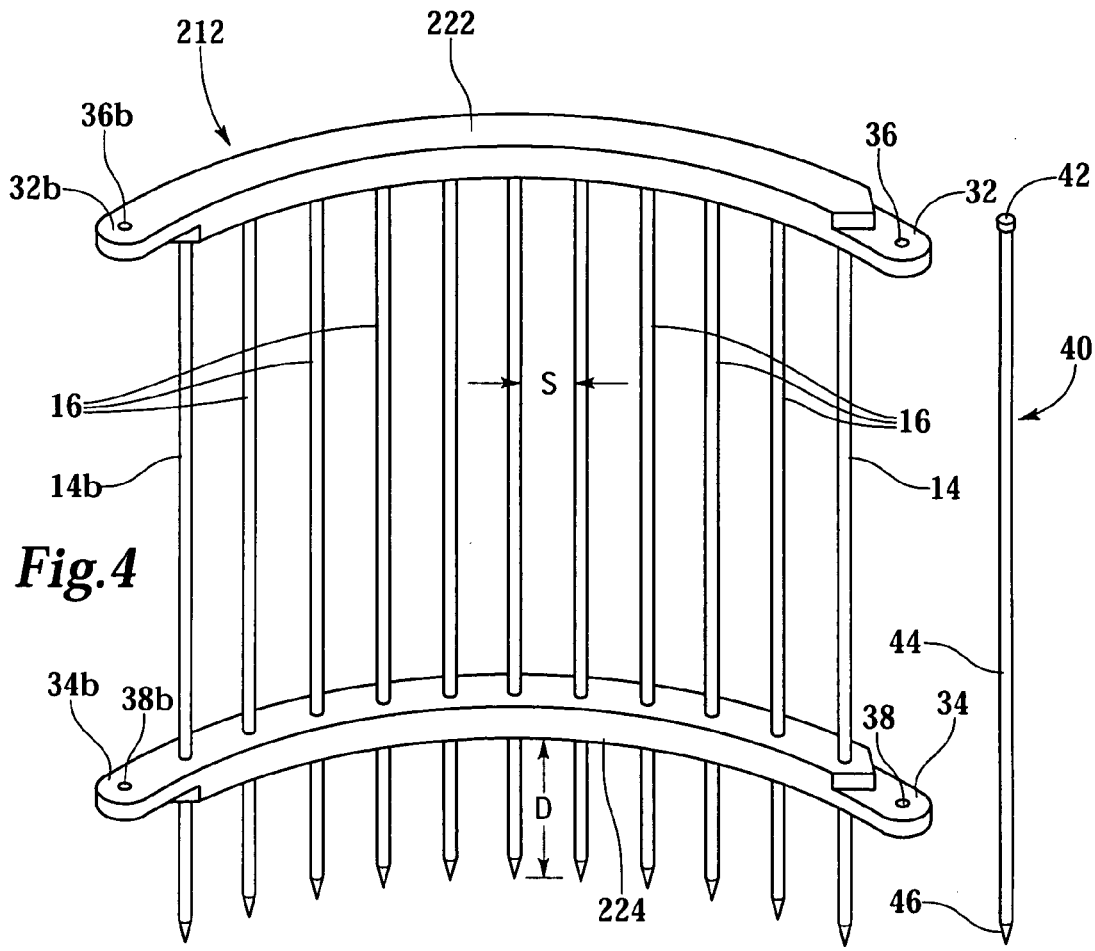
*Fig.4*
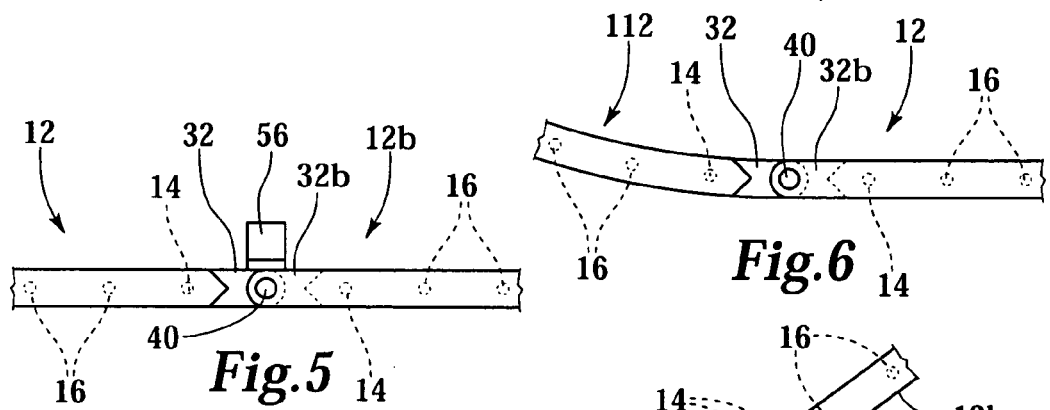
*Fig.5*  *Fig.6*
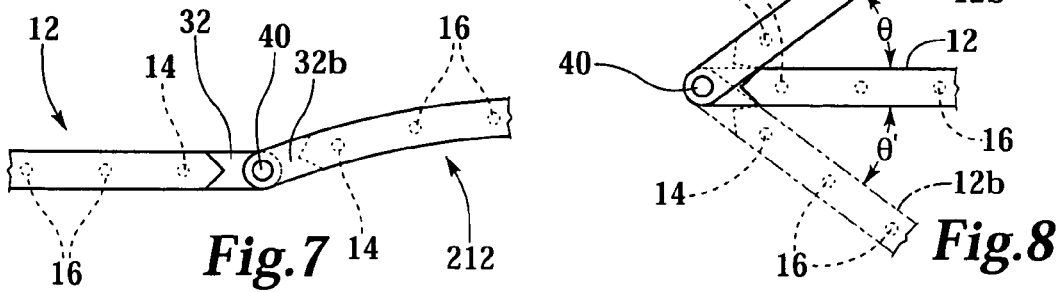
*Fig.7*  *Fig.8*

MODULAR FENCE

BACKGROUND OF THE INVENTION

1. Field of the Invention

The present invention is directed toward a modular fence for enclosing an area of land, particularly to a fence for preventing burrowing animals from entering a garden.

2. Description of the Related Art

Gardening has become a popular hobby among homeowners. Gardens are known to be expensive to maintain due to the cost of plants and their upkeep. One challenge that gardeners have faced is preventing animals from damaging their plants. In particular, rabbits are known to cause substantial damage to gardens by infiltrating the garden and eating its plants.

Fences have been erected in an attempt to discourage or prevent animals from burrowing under the fence. However, fences typically have been difficult to install, particularly for those with little or no experience in fence building, because of the special skill and physical strength required to build them. Also, fence building is time consuming, and in many cases may require expensive, specialized tools. Moreover, many fences require gates to be installed in the fence, which requires moving parts and additional skill to install. Traditional fences also are permanent, so that they may be hard to work around during yard work, such as mowing a lawn or tilling a garden. Rabbits also are good diggers, so that merely erecting a fence typically does not prevent rabbits from entering the garden.

Wire garden fences have been built that are partially buried to prevent animals from burrowing under the fence. However, these all-wire fences are flimsy, can be damaged, and have typically been used for only one growing season each.

What is needed is a sturdy, easy-to-install garden fence for discouraging burrowing animals from entering a garden, and that is easy to remove when needed.

BRIEF SUMMARY OF THE INVENTION

A fence module for use in a burrowing-animal discouraging modular fence is provided including a plurality of generally parallel elongate members each having an upper end and a tapered lower end, upper and lower crossbars connecting the plurality of elongate members in a row with a pair of end members and a plurality of intermediate members, wherein the elongate members have a spacing of between about 1 inch and about 2½ inches, a connector extending outwardly beyond at least one of the pair of end members for closely connecting the module to another module, wherein the tapered lower ends of the elongate members extend at least about 3 inches below the lower crossbar for insertion into ground, and wherein the elongate members extend at least about 16 inches above the lower crossbar.

In one embodiment, a fence module for use in a burrowing-animal discouraging modular fence is provided includes a plurality of generally parallel elongate members each having an upper end and a tapered lower end, upper and lower crossbars connecting the plurality of elongate members in a row with a pair of end members and a plurality of intermediate members, wherein the elongate members have a spacing of between about 1 inch and about 2½ inches, two pairs of lips, each pair comprising upper and lower lips, each pair of lips extending outwardly beyond a corresponding one of the pair of end members, each of the pairs of lips providing guides for receiving an elongate stake for connecting each pair of lips to a corresponding pair of lips on another module, wherein the elongate stake includes a tapered lower end for insertion into ground, wherein spacing between the elongate stake and the corresponding end member is not more than about 2½ inches, wherein the tapered lower ends of the elongate members extend at least about 3 inches below the lower crossbar for insertion into ground, and wherein the elongate members extend at least about 16 inches above the lower crossbar.

A modular fence is also provided for discouraging burrowing animals, the fence including a plurality of modules each having a plurality of generally parallel elongate members each having an upper end and a tapered lower end, upper and lower crossbars connecting the plurality of elongate members in a row with a pair of end members and a plurality of intermediate members, wherein the elongate members have a spacing of between about 1 inch and about 2½ inches, two pairs of lips, each pair comprising upper and lower lips, each pair of lips extending outwardly beyond a corresponding one of the pair of end members, each of the pairs of lips providing guides for receiving an elongate stake for connecting each pair of lips to a corresponding pair of lips on another module, wherein the tapered lower ends of the elongate members extend at least about 3 inches below the lower crossbar for insertion into ground; and wherein the elongate members extend at least about 16 inches above the lower crossbar, wherein some of the plurality of the modules each include a generally straight row of the elongate members, wherein some of the plurality of the modules each include a curved row of the elongate members, wherein the elongate stake includes a tapered lower end for insertion into the ground, and wherein the elongate stake is no more than about 2½ inches away from the corresponding end members of the connected modules.

A method of installing a modular fence for discouraging burrowing animals is also provided comprising the steps of providing a plurality of modules, each having a plurality of generally parallel elongate members each having an upper end and a tapered lower end, upper and lower crossbars connecting said plurality of elongate members in a row with a pair of end members and a plurality of intermediate members, wherein said elongate members have spacing of between about 1 inch and about 2½ inches, a connector extending outwardly beyond at least one of said pair of end members, said connector providing a guide, wherein said tapered lower ends of said elongate members extend at least about 3 inches below said lower crossbar, wherein said elongate members extend at least about 16 inches above said lower crossbar, wherein some of said plurality of said modules each include a generally straight row of said elongate members, wherein some of said plurality of said modules each include a curved row of said elongate members, positioning said plurality of modules along a border of an area to be enclosed, inserting said tapered lower ends of said elongate members of said plurality of modules at least about 3 inches into ground, and inserting an elongate stake having a tapered lower end through said guides of said modules and into said ground to connect said adjacent modules together, wherein spacing between said elongate stake and the corresponding end member is not more than about 2½ inches.

These and other features and advantages are evident from the following description of the present invention, with reference to the accompanying drawings.

BRIEF DESCRIPTION OF THE SEVERAL VIEWS OF THE DRAWINGS

FIG. 2 is a perspective view of a straight module for use in the modular fence.

FIG. 3 is a perspective view of a right-hand curved module for use in the modular fence.

FIG. 4 is a perspective view of a left-hand curved module for use in the modular fence.

FIG. 5 is a top view of two straight modules connected together with an elongate stake.

FIG. 6 is a top view of the straight module and the right-hand curved module connected together with the elongate stake.

FIG. 7 is a top view of the straight module and the left-hand curved module connected together with the elongate stake.

FIG. 8 is a top view of two straight modules connected together with the elongate stake wherein the straight modules are angled with respect to one another.

DETAILED DESCRIPTION OF THE INVENTION

Figure 1:
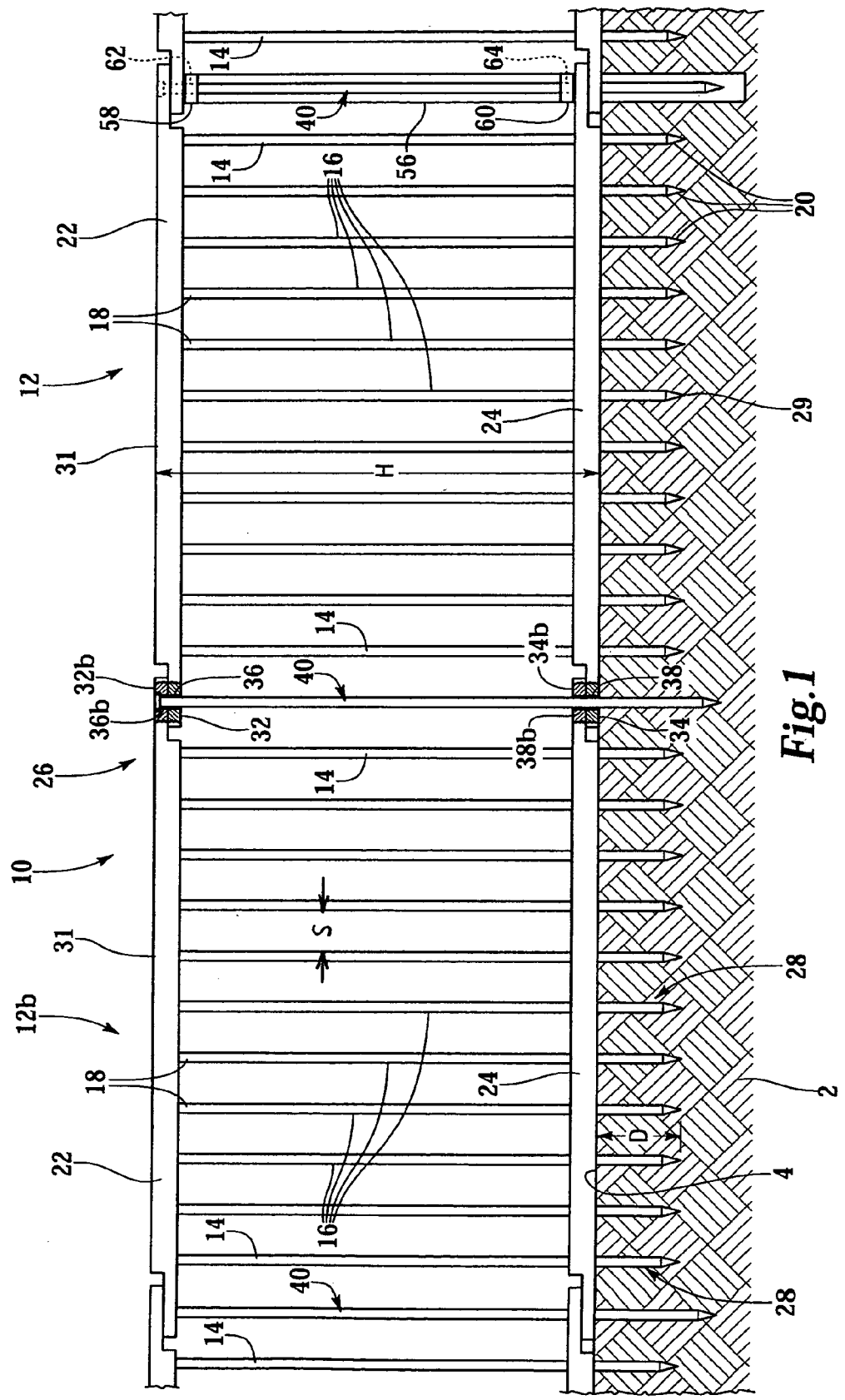
FIG. 1 is a side view of a modular fence installed in ground.

Referring to FIG. 1, a modular fence 10 is shown for preventing burrowing animals, such as rabbits, from entering a garden in order to prevent the animals from damaging plants in the garden. Fence 10 includes a plurality of modules 12 connected together in series in order to enclose the garden, wherein each module 12 of fence 10 includes a plurality of generally parallel elongate members 14, 16 each having an upper end 18 and a tapered lower end 20, upper and lower crossbars 22, 24 connecting the plurality of elongate members 14, 16 in a row with a pair of end members 14 and a plurality of intermediate members 16, wherein elongate members 14, 16 have a spacing S of between about 1 inch and about 2½ inches, a connector 26 extending outwardly beyond at least one of the end members 14 for closely connecting the module 12 to another module 12b, wherein tapered lower ends 20 of elongate members 14, 16 extend at least about 3 inches below lower crossbar 24 for insertion into ground 2, and wherein elongate members 14, 16 extend at least about 16 inches above lower crossbar 24.

Fence 10 is preferably resistant to rust or corrosion because fence 10 will be exposed to normal weather conditions, including rain, and because fence 10 may be exposed to potentially corrosive chemicals, including fertilizer, pesticide, and herbicide. Portions of fence 10 can be made out of plastics, metals, or other rust and corrosion resistant materials, but preferably fence 10 is made out of a sturdy and strong material that will be able to resist damage due to the elements, or from the burrowing animals' attempt to bypass fence 10. Preferably, fence 10 is made from metal, such as stainless steel, galvanized steel, aluminum, or metal alloys including aluminum alloys. Preferably, fence 10 is made from aluminum or an aluminum alloy because aluminum is strong, durable, and light so that fence 10 will be relatively easy to install, even for a gardener with little or no experience in building fences. Also, recent advances in aluminum technology and prices have made the production of a fence out of aluminum economically and technologically feasible.

Continuing with FIG. 1, each module 12 includes a plurality of generally parallel elongate members 14, 16 that are connected together by upper and lower crossbars 22, 24 so that members 14, 16 are closely spaced together to prevent animals from passing between members 14, 16 and through fence 10. Members 14, 16 are inserted to a predetermined depth D into the ground 2 to discourage the burrowing animals from digging under fence 10 to get into the garden. Preferably, members 14, 16 are generally vertical so that it is easier for the installer to insert members 14, 16 into ground 2.

Each member 14, 16 is preferably rigid to prevent fence 10 from collapsing if animals try jumping over fence 10 to enter the garden or into fence 10 in an attempt to collapse it. In one embodiment, each member 14, 16 is generally tubular, and preferably, each member 14, 16 is generally cylindrical, as shown in FIG. 2, having a diameter that is large enough to provide strength and durability to member 14, 16, yet small enough so that fence 10 does not block too much light from the plants in the garden. In one embodiment, the diameter of each member 14, 16 is between about ¼ inch and about ¾ inch, preferably between about ⅜ inch and about ⅝ inch, still more preferably about ½ inch. In one embodiment, members 14, 16 are made from a corrosion and rust resistant metal, and preferably, members 14, 16 are made from aluminum or aluminum alloy so that fence 10 is durable, yet light and easy to install.

Each member 14, 16 has an upper end 18 and a tapered lower end 20, wherein tapered lower end 20 is inserted into the ground 2 to a predetermined depth D to stabilize module 12 in an upright position and to provide a barrier below ground level 4 comprised of buried lower portions 28 of members 14, 16 so that if a burrowing animal attempts to dig under fence 10, it will encounter buried lower portions 28 which it cannot bypass because of the close spacing S between members 14, 16. In one embodiment, tapered lower ends 20 form points 29 to more easily penetrate ground 2 so that it is easy for a gardener to install fence 10 without special tools or prior experience in building fences.

Buried portions 28 of members 14, 16 should be long enough to discourage the burrowing animals from entering the garden, but not so long that it is difficult to install fence 10, particularly in hard earth, or so that buried portions 28 make fence 10 overly expensive due to the cost of material needed for longer members 14, 16. In one embodiment, tapered lower ends 20 of members 14, 16 extend at least about 3 inches, preferably between about 3 inches and about 9 inches, still more preferably between about 4 inches and about 6 inches beyond lower crossbar 24.

Preferably, buried portion 28 of each member 14, 16 are of uniform length so that tapered lower ends 20 are aligned generally along the same horizontal line so that all of the plurality of members 14, 16 are inserted essentially to the same depth D below ground level 4 instead of to various depths along the length of fence 10.

Continuing with FIG. 1, members 14, 16 are connected in a row by an upper crossbar 22 and a lower crossbar 24 so that members 14, 16 are closely spaced to prevent the animals from passing between adjacent members 14, 16. Members 14, 16 are generally vertical and parallel to each other so that the spacing between members 14, 16 remains constant along the height of fence 10 so that the spaces between members 14, 16 are small enough throughout the entire height of fence 10 to prevent the animals from passing between adjacent members 14, 16.

Members 14, 16 have a spacing S that is close enough to prevent an animal from passing between adjacent members 14, 16 and through fence 10. The spacing S between members 14, 16 should be small enough to prevent the entry of the animal, yet large enough so that fence 10 allows enough light through for the plants and so that fence 10 is not overly expensive due to the extra material that would be needed for additional members 14, 16. For rabbits, it is preferred that the spacing S between members 14, 16 be between about 1 inch and about 2½ inches, preferably about 2 inches.

Turning to FIGS. 1 and 2, members 14, 16 extend upwardly from ground level 4 to a height H that is high enough so that the animals cannot jump, step, or climb over fence 10, yet low enough so that fence 10 does not block too much light from the plants, or that is overly expensive due to the increased height. Rabbits are known to be good leapers, but poor climbers, therefore it is preferred that members 14, 16 extend to a height H that is high enough to prevent a rabbit from jumping over fence 10. Fence 10 should also be short enough for a gardener to easily work or step over fence 10 without needing to install a gate. Fence 10 may have a height H of at least 16 inches, preferably between about 16 inches and about 24 inches, and still more preferably about 20 inches. Preferably, the height H of each member 14, 16 is substantially uniform so that upper ends 18 also are aligned along a horizontal line so that an upper edge 31 of fence 10 is generally straight and generally parallel to ground 2 along the length of fence 10. In one embodiment, upper crossbar 22 is at upper ends 18 of members 14, 16 so that upper cross bar 22 is at the desired height H above ground level 4.

Turning to FIG. 1, crossbars 22, 24 connect members 14, 16 together in a row so that there is a pair of end members 14 and a plurality of intermediate members 16 positioned between end members 14. As with members 14, 16, preferably crossbars 22, 24 are rigid so that fence 10 is sturdy and cannot be collapsed by the burrowing animals. Preferably, crossbars 22, 24 are also made from a corrosion and rust resistant material, such as stainless steel or aluminum. In one embodiment, crossbars 22, 24 are made from aluminum or an aluminum alloy to correspond with the aluminum members 14, 16.

Crossbars 22, 24 may extend across the entire length of module 12 as a continuous bar with each member 14, 16 being mounted to the same crossbars 22, 24, as shown in FIG. 2, or crossbars 22, 24 may be broken up into sections (not shown), wherein a first crossbar section connects an end member to a first intermediate member, a second crossbar section connects the first intermediate member to a second intermediate member, and a third crossbar section connects the second intermediate member to a third intermediate member, and so on until all of the members are connected together in a row by the plurality of crossbar sections.

Continuing with FIG. 2, in one embodiment, each crossbar 22, 24 has a generally rectangular cross section and includes a plurality of mounting holes 30 in which members 14, 16 are mounted, wherein adjacent mounting holes 30 are spaced by the predetermined spacing distance S so that members 14, 16 are spaced by the spacing distance S.

Upper crossbar 22 preferably connects members 14, 16 proximate upper ends 18 of members 14, 16 to provide support and stability. In one embodiment, upper crossbar 22 is mounted along upper ends 18 of members 14, 16 so that upper crossbar 22 is above upper ends 18 to provide a cap for each member 14, 16 in order to provide a uniform upper edge 31 along fence 10.

Lower crossbar 24 preferably connects members 14, 16 at a position that is spaced from tapered lower ends 20 so that members 14, 16 extend below lower crossbar 24. Preferably, the length which members 14, 16 extend below lower crossbar 24 is equal to the desired length of buried portions 28 so that members 14, 16 are buried to depth D. In this way, lower crossbar 24 acts as a stop to provide an indication to the installer as to how far to drive module 12 into ground 2. For example, when driving module 12 shown in FIG. 1 into ground 2, eventually lower crossbar 24 encounters ground level 4, which interferes with the continued insertion of members 14, 16 into ground 2, making it significantly more difficult to drive module 12 into ground 2. When the installer feels this difficulty in driving module 12, the installer knows that lower crossbar 24 is at ground level 4 and that tapered lower ends 20 have been driven to an effective depth D to discourage burrowing animals from entering the garden.

Continuing with FIG. 1, preferably lower crossbar 24 is generally horizontal and generally parallel to ground level 4 so that lower crossbar 24 substantially abuts ground 2 and provides a stop along the length of module 12. Preferably, upper crossbar 22 is also generally horizontal and parallel to ground level 4 and lower crossbar 24 to provide good stability along the length of fence 10.

Gardens come in many shapes and sizes, including irregularly shaped gardens with curved or angled borders. For this reason, it is preferred that connected modules 12, 12b be capable of being angled with respect to each other, as shown in FIG. 8. Modules 12 and 12b can be positioned so that they are angled with respect to each other over a wide range of angles.

Fence 10 can include an elongate stake 40 for connecting adjacent modules 12, 12b together. In one embodiment, elongate stake 40 includes a head 42, a long shank 44, and a tapered lower end 46 for insertion into ground 2. There is a spacing between elongate stake 40 and the corresponding end member 14 that is not more than about 2½ inches, and preferably the spacing between stake 40 and the corresponding end members 14 is between about 1 inch and about 2½ inches, still more preferably about 2 inches. The close spacing between stake 40 and end members 14 ensures that all a rabbit or other burrowing animals sees is the exposed portions of members 14, 16 and stake 40 that are closely spaced so that there is no gap for the animal to get through. The rabbit experiences a similar problem if it attempts to burrow under the fence, because the rabbit encounters buried portions 28 of members 14, 16, which are also too closely spaced for the rabbit to fit through.

Figure 9:
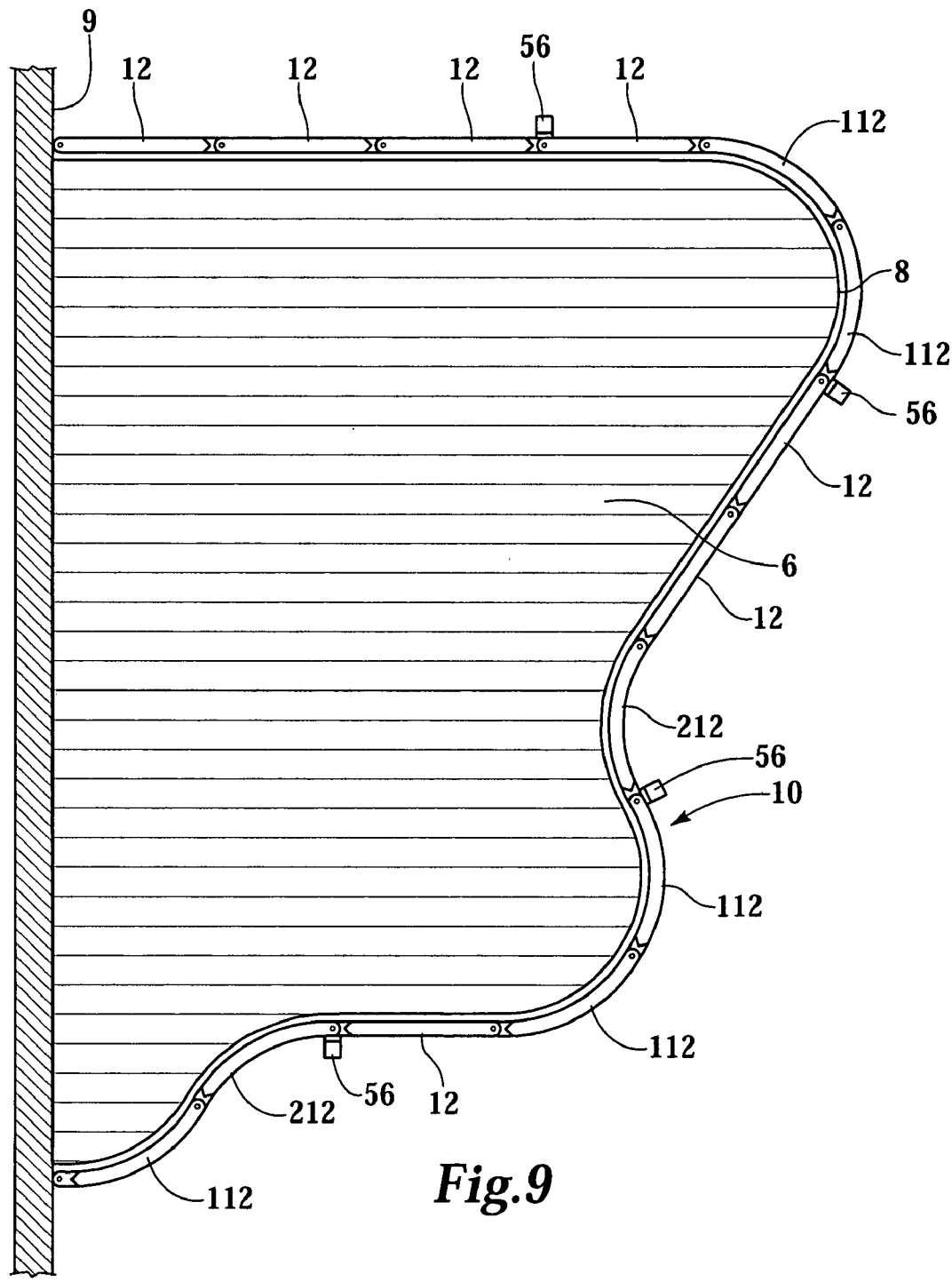
FIG. 9 is a top view of a plurality of installed straight modules and curved modules enclosing a garden.

Continuing with FIGS. 1, 2, and 9, it may be desirable to brace fence 10 to ensure that it will remain upright. Therefore, in one embodiment, fence 10 includes a plurality of anchor braces 56 that engage and brace fence 10 against collapse. Each brace 56 has a cross section that is substantially larger than the cross section of members 14, 16 and stake 40. In one embodiment, shown best in FIG. 2, brace 56 is generally rectangular in shape with a length that is approximately equal to the length of stake 40. Each brace 56 includes an upper lip 58 that corresponds to upper lips 32, 32b of a pair of connected modules 12, 12b, and a lower lip 60 that corresponds to lower lips 34, 34b of modules 12, 12b. Lips 58, 60 of brace 56 each include a guide 62, 64, which accept elongate stake 40, which is inserted through upper guides 36, 36b, and 62 and then through lower guides 38, 38b, and 64, as shown in FIG. 1.

Each brace 56 is inserted into ground 2 to provide additional support within ground 2 due to the larger cross section of each brace 56. Preferably, each brace 56 is inserted into ground 2 at least to the depth D of members 14, 16, and more preferably deeper than depth D. In one embodiment, shown in FIG. 1, brace 56 is driven to a depth approximately equal to the depth of stake 40. Each brace 56 is driven into ground 2 with a pounding tool, such as a rubber mallet or sledge hammer. Because of its larger cross-section, brace 56 is preferably driven by a sledge or other pounding tool intended to withstand the forces associated with driving brace 56.

Preferably, braces 56 are substantially evenly spaced along the length of fence 10, as shown in FIG. 9. Each brace 56 may be placed between about every module 12 and about every 10 modules, preferably between about every 3 modules and about every 8 modules. Braces 56 can be easily added or removed as needed if it is determined that more braces 56 or fewer braces 56, respectively, are needed at a particular point along fence 10.

This ability to have an angled connection is accomplished with a connector 26 extending outwardly beyond at least one of the pair of end members 14 for closely connecting module 12 to a second module 12b. In one embodiment, each module 12 includes two pairs of lips, each pair comprising upper and lower lips 32, 34, each pair of lips 32, 34 extending outwardly beyond a corresponding one of the pair of end members 14, wherein each pair of lips 32, 34 provides guides, an upper guide 36 in upper lip 32 and a lower guide 38 in lower lip 34, for receiving an elongate stake 40 for connecting each pair of lips 32, 34 to a corresponding pair of lips 32b, 34b on another module 12b.

Guide 36 of upper lip 32 is aligned with guide 36b of upper lip 32b of second module 12b and guide 38 of lower lip of first module 12 is aligned with guide 38b of lower lip 34b of second module 12b, and elongate stake 40 is inserted through guides 36, 36b, 38, 38b to connect the pairs of lips, and hence to connect modules 12, 12b together. In one embodiment, shown in FIGS. 1 and 2, guides 36, 38 are holes, and elongate connecting stake 40 is a long pin or stake that is inserted through the holes in the pair of lips 32, 34. In one embodiment, guide 36 in upper lip 32 is counterbored to accommodate head 42 of stake 40 so that an installer does not drive stake 40 too far.

Preferably, the spacing S between elongate members 14, 16 and the spacing between the corresponding end member 14 and stake 40 is uniform so that the burrowing animals encounter a continuous array of members 14, 16 and stakes 40 that will discourage them from entering the garden.

Turning back to FIG. 2, in one embodiment, a first upper lip 32 extending beyond one of end members 14 is positioned so that it is below a second upper lip 32b extending beyond the other end member 14b, so that when first upper lip 32 of first module 12 is brought into engagement with second upper lip 32b of a second module 12b the first upper lip 32 fits underneath second upper lip 32b so that upper crossbar 22 of first module 12 is aligned with upper crossbar 22b of second module 12b, as shown in FIG. 1. Similarly, a first lower lip 34 that extends beyond one of end members 14 is position below a second lower lip 34b extending beyond the other end member 14b, so that when first lower lip 34 is engaged with second lower lip 34b, first lower lip 34 fits below second lower lip 34b so that lower crossbar 24 of first module 12 is aligned with lower crossbar 24b of second module 12b, as shown in FIG. 1.

In one embodiment, shown in FIG. 2, the lips of each module 12 are included on crossbars 22, 24 so that upper lips 32, 32b are included on upper crossbar 22 and lower lips 34, 34b are included on lower crossbar 24. First upper lip 32 extends from a first end 48 of upper crossbar 22 and second upper lip 32b extends from a second end 50 of upper crossbar 22, while first lower lip 34 extends from a first end 52 of lower crossbar 24 and second lower lip 34b extends from a second end 54 of lower crossbar 24.

Continuing with FIG. 1, elongate stake 40 is inserted through guides 36 and 36b to connect upper lips 32 and 32b together and through guides 38 and 38b to connect lower lips 34 and 34b together in order to connect modules 12, 12b together. In one embodiment, elongate stake 40 also is driven into ground 2 at least to the depth D of tapered lower ends 20 of members 14, 16. Preferably, elongate member is a long stainless steel stake so that stake 40 can more easily be inserted into ground 2, and so that stake 40 will be sturdier. Also, preferably tapered lower end 46 of stake 40 is driven to a depth below the depth D of members 14, 16, as shown in FIG. 1, so that the elongate stake 40 provides strong support for both adjacent modules 12, 12b that it is connecting in order to keep fence 10 upright. In one embodiment, members 14, 16 are driven to a depth D of about 3 inches, while stake 40 is driven to a depth of between about 3 inches and about 6 inches, preferably about 4.5 inches.

In one embodiment, adjacent modules 12, 12b can be angled with respect to each other between an angle θ of about 30° in one direction to an angle θ' of about 30° in the opposite direction, see FIG. 8, or over a range of about 300° to accommodate nearly every type of angled garden, while still providing members 14, 16 that are spaced closely enough to prevent burrowing animals from entering the garden.

Turning to FIGS. 2–4, in one embodiment, at least two different types of modules 12, 112 of garden fence 10 are provided; a straight or generally planar module 12, and a curved module 112, wherein some of the plurality of modules 12, 112 are straight modules 12 and some of the plurality of modules 12, 112 are curved modules 112.

As shown in FIG. 2, straight module 12 includes generally linear crossbars 22, 24 so that the row of members 14, 16 is generally straight and aligned generally in a common plane. Straight module 12 is used along generally straight portions of a garden 6, see FIG. 9. Preferably, straight module 12 may have a length L of between about ½ foot and about 6 feet, more preferably between about 1 foot and about 3 feet, still more preferably about 2 feet.

Turning to FIG. 3, a curved module 122 has crossbars 122, 124 that are curved so that members 14, 16 form an arc. Members 14, 16 of curved module 112 are still generally parallel to each other, and preferably are generally vertical, but members 14, 16 of curved module 112 are not coplanar, but rather are positioned at different points along the arc formed curved crossbars 122, 124 so that members 14, 16 are spaced along a curved plane.

In one embodiment, the row of members 14, 16 of curved module 112 forms an arc of between about 30° and about 90°, preferably between about 45° and about 72°, still more preferably about 60°. Preferably, a whole number of curved modules 112 can be combined in series to make an entire circular fence 10, For example, if curved modules 112 comprise arcs of about 60°, then six curved modules 112 are combined together form a complete circular fence, if the arcs are 90° arcs, four curved modules 112 are combined to form a complete circular fence. Arcs of 60° are preferred for some applications because many garden curves can be approximated with 60° curved modules 112. In other situations, 45° arcs are preferred because a whole number of curved modules 112 forms a 90° angle between adjacent sections of fence 10.

The radius of curvature of curved modules 112 can be selected depending on the sizes of gardens expected to be enclosed by fence 10. In one embodiment, the radius of curvature of curved module 112 is between about 1 foot and about 6 feet, preferably between about 1½ feet and about 3 feet, still more preferably about 1.9 feet. It may be desirable to create curved modules 112 based on the desired length of each curved module 112 along its arc. The length of curved module 112 along its arc may be between about ½ foot and about 6 feet, preferably between about 1 foot and about 3 feet, still more preferably about 2 feet.

As described above, in one embodiment there are two pairs of lips, first lips 32 and 34 and second lips 32b and 34b, wherein the first lips 32, 34 are positioned below the second lips 32b, 34b. For this reason, in a preferred embodiment, two different types of curved modules 112, 212 are provided so that fence 10 can facilitate bends or corners in either a clockwise direction or in a counterclockwise direction, as desired. One of the curved modules 112, shown in FIG. 3, has curved crossbars 122 and 124 that form a right-hand curve as module 112 extends from first lips 32, 34 toward second lips 32b, 34b, whereas the other curved module 212, shown in FIG. 4, has curved crossbars 22 and 224 that form a left-hand curve as module 212 extends from first lips 32, 34 toward second lips 32b, 34b.

Turning to FIGS. 5–9, different combinations of straight modules 12, right-hand curved modules 112, and left-hand curved modules 212 can be connected in different orders to allow for many different sizes and shapes of gardens so that modular fence 10 of the present invention can be erected to accommodate gardens of regular shapes, such as circular or rectangular gardens, or of irregular shapes, such as garden 6 shown in FIG. 9, while still providing adequate prevention of infiltration by burrowing animals.

Continuing with FIGS. 1 and 9, the method by which a gardener installs modular fence 10 includes the steps of providing a plurality of modules 12, 112, 212 each having a plurality of generally parallel elongate members 14, 16 each having an upper end 18 and a tapered lower end 20, upper and lower crossbars 22, 24 connecting the plurality of elongate members 14, 16 in a row with a pair of end members 14 and a plurality of intermediate members 16, wherein elongate members 14, 16 have spacing of between about 1 inch and about 2½ inches between adjacent members 14, 16, a connector 26 extending outwardly beyond a corresponding one of the pair of end members 14, the connector 26 providing a guide 36, wherein tapered lower ends 20 of elongate members 14, 16 extend at least about 3 inches below lower crossbar 24, and wherein elongate members 14, 16 extend at least about 16 inches above lower crossbar 24, wherein some of the plurality of modules are straight modules 12 having a generally straight row of elongate members 14, 16, and some of the plurality of modules are curved modules 112, 212 having a curved row of elongate members 14, 16, positioning the plurality of modules 12, 112, 212 along a border 8 of an area to be enclosed, such as a garden 6, inserting tapered lower ends 20 of elongate members 14, 16 of the plurality of modules 12, 112, 212 at least about 3 inches into ground 2, and inserting an elongate stake 40 having a tapered lower end 46 through guides 36 of connectors 26 and into ground 2 to connect adjacent modules 12, 112, 212 together so that the spacing between elongate stake 40 and the corresponding end member 14 is not more than about 2½ inches.

In one method, inserting tapered lower ends 20 of elongate members 14, 16 into ground 2 includes pounding upper crossbar 22 with a rubber mallet or other pounding tool to drive tapered lower ends 20 of members 14, 16 into ground 2. Inserting elongate stake 40 through guides 36, 38, and into ground 2 includes pounding stake 40 with a pounding tool. However, because stake 40 is preferably made from steel, and is preferably driven to a depth that is deeper than depth D of tapered lower ends 20 of members 14, 16, stake 40 may need to be driven with a sledge hammer rather than a rubber mallet. An installer may also wish to soften ground 2 in preparation for insertion of members 14, 16 and stake 40, such as by using a ROTOTILLER, a hoe, or water.

In another method, modules 12, 112, 212 are installed by first inserting tapered lower ends 20 of a first module 12 into ground 2, then by positioning a second module 12b so that second lips 32b, 34b of second module 12b are above first lips 32, 34 of first module 12 and so that guides 36b, 38b of second module 12b are aligned with guides 36, 38 of first module 12, then driving members 14, 16 of second module 12b into ground 2, then driving elongate stake 40 through guides 36 and 36b and guides 38 and 38b and into ground 2. This process is repeated with a third module, followed by a forth module, etc., until fence 10 has been erected along the borders and garden 6 is enclosed.

In another method, modular fence 10 is being erected around an existing garden having an existing shape, so that an installer first determines what the perimeter of the garden is, and how many straight modules 12, right-hand curved modules 112, and left-hand curved modules 212 he or she needs. For example, for an irregularly shaped garden having straight border sections and curved border sections, see FIG. 9, the installer determines how long the straight border sections are to determine how many straight modules 12 are needed. The gardener then determines what combinations of curved modules 112, 212 and additional straight modules 12 (if needed) along the curved border sections. The corresponding number of straight modules 12, right-hand curved modules 112, and left-hand curved modules 212 are provided and positioned at the appropriate positions along the border of the garden so that once modules 12, 112, 212 are positioned and installed, as described above, the garden will be enclosed to prevent burrowing animals from entering the garden. As can be seen in FIG. 9, fence 10 alone need not completely surround the entire garden 6. An already existing barrier, such as a house 9 and its foundation, can provide a portion of the barrier along border 8 of garden 6 to prevent burrowing animals from entering garden 6, so long as there is not a gap larger than about 2½ inches, and preferably between about 1 inch and about 2½ inch, still more preferably about 2 inches, between fence 10 and the preexisting barrier. Other preexisting objects, such as trees, a previously installed fence 10, or other objects that provide a barrier along a portion of garden border 8, can be used in conjunction with fence 10 to prevent burrowing animals from entering garden 6.

Elongate stakes 40 are then inserted through guides 36, 38 in lips and driven into ground 2 to connect adjacent modules 12, 112, 212 together and to secure modules 12, 112, 212 to ground 2. A single elongate stake 40 for connecting adjacent modules 12, 112, 212 allows a gardener to easily erect and install modular fence 10 without specialized tools or skills. Fence modules 12 and elongate stake 40 are all that the gardener needs to install, which can be done using a rubber mallet or other pounding tool to drive members 14, 16 and elongate stake 40 into ground 2. Fence 10 of the present invention are also easy for a gardener or other installer to uninstall simply by pulling elongate stake 40 out of ground 2, and then pulling modules 12, 112, 212 out of ground 2.

The modular fence of the present invention provides a sturdy means for preventing and discouraging burrowing animals, such as rabbits, from entering a garden by providing an above-ground barrier of closely spaced members through which the animals cannot pass, and a below-ground barrier of the closely spaced members which is difficult for the animals to burrow under. The modular fence of the present invention is also easy to install and uninstall, even if it is being installed or uninstalled by someone with little or no experience building fences because it requires no special tools or instructions.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A modular fence for discouraging burrowing animals, comprising:

a plurality of modules each having;

a plurality of generally parallel elongate members each having an upper end and a tapered lower end;

upper and lower crossbars connecting said plurality of elongate members in a row with a pair of end members and a plurality of intermediate members, wherein said elongate members have a spacing of between about 1 inch and about 2½ inches each of said upper and lower corssbars comprising a continuous, solid, homogeneously formed and unbroken member;

two pairs of lips, each pair comprising upper and lower lips, each pair of lips extending outwardly beyond a corresponding one of said pair of end members, each of said pairs of lips providing guides for receiving an elongate stake for connecting each pair of lips to a corresponding pair of lips on another module;

said tapered lower ends of said elongate members extending at least about 3 inches below said lower crossbar for insertion into ground;

said elongate members extending at least about 16 inches above said lower crossbar;

wherein some of said plurality of said modules each include a generally straight row of said elongate members;

wherein some of said plurality of said modules each include a curved row of said elongate members;

wherein said elongate stake includes a tapered lower end for insertion into said ground, and wherein said elongate stake is no more than about 2½ inches away from said corresponding end members of said connected modules.

2. A modular fence according to claim 1, further comprising an anchor brace inserted into said ground, said anchor brace having a cross section that is larger than said elongate stake and said members and at lease one lip protruding outwardly from said brace, said lip of said brace including a guide for receiving said elongate stake.

* * * * *